(12) United States Patent
Son

(10) Patent No.: US 6,433,930 B1
(45) Date of Patent: Aug. 13, 2002

(54) MULTIVIEW THREE-DIMENSIONAL IMAGE DISPLAY APPARATUS

(75) Inventor: Jung Young Son, Kyung-Ki Do (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/335,524

(22) Filed: Jun. 18, 1999

(30) Foreign Application Priority Data

Jun. 18, 1998 (KR) ........................................ 1998-22885

(51) Int. Cl.⁷ .......................... G02B 27/22; H04N 13/04
(52) U.S. Cl. .......................... 359/464; 359/462; 348/51; 348/55
(58) Field of Search ................................. 359/462, 464, 359/463; 348/55, 56, 51, 54; 349/15; 353/7, 8, 9

(56) References Cited

U.S. PATENT DOCUMENTS 5,410,345 A * 4/1995 Eichenlaub ................. 359/475
5,526,146 A * 6/1996 Goodman et al. ............. 348/54
5,936,767 A * 8/1999 Favalora ...................... 359/462
5,982,526 A * 11/1999 Yamada et al. ............. 359/212

\* cited by examiner

*Primary Examiner*—Audrey Chang
*Assistant Examiner*—Jennifer Winstedt
(74) *Attorney, Agent, or Firm*—Oblon, Spivak, McClelland, Maier & Neustadt, P.C.

(57) ABSTRACT

A multiview three-dimensional image display apparatus comprises: a light source, a shutter plate for selectively passing light from the source; a diffuser immediately adjacent the shutter plates an optical element in front of the diffuser for forming a viewing zone; and a transparent display immediately adjacent the optical element for displaying multiview images thereon, wherein the multiview images are displayed based on a time-multiplexing technique and the viewing zone is formed in front of the transparent display. The apparatus can be readily modified into a multiview apparatus that includes a plurality of light sources. Since a plurality of viewing zones can be simultaneously formed in the apparatus, it is possible for multiple viewers to simultaneously observe the same three-dimensional image.

2 Claims, 4 Drawing Sheets

MULTIVIEW THREE-DIMENSIONAL IMAGE DISPLAY APPARATUS

BACKGROUND OF THE INVENTION

1. Technical Field

The present invention relates to image display apparatus and, more particularly, to a multiview three-dimensional image display apparatus.

2. Description of the Related Art

All three-dimensional image display apparatus, other than those that provide true tree-dimensional images, provide only an illusion of three-dimensionally, since these apparatus form viewing zones on two-dimensional surfaces, such as the screen of a cathode ray tube. On such two-dimensional surfaces, images of an object captured from a plurality of perspectives are separated in space and time by intervals dictated by the space- or time-multiplexed technique employed to capture the images.

The viewing zone comprises a plurality of sub-zones, where each sub-zone corresponds to a different one of the desired perspectives of the object and each sub-zone comprises two regions separated by a distance less than the separation of the eyes of the viewer. A viewer who fixes his eyes on the viewing zone visually experiences the sensation of depth, since images of the object captured from two different perspectives impinge on the viewer's right and left retinas.

In a contact-type three-dimensional image display apparatus, a flat optical element, such as a lenticular plate or parallax barrier plate, is disposed immediately adjacent a flat display and a sensation of three-dimensionality is provided by use of a space-multiplexed technique to capture the images. In a space-multiplexed imaging technique, the resolution of each of multiview image frames is reduced to be the number of view points without changing the rate at which the images are captured, and each of the multiview image frames is sequentially repeated and combined on a pixel basis to be merged into one image frame so that the merged image frame may be displayed on a display. The function of the optical element is to classify images from the multiple viewpoints, which are mixed in a periodic pattern and displayed on the display, into each group of images from the same viewpoints, resulting in the images in the same group being combined and displayed at the viewing zone.

In a projection-type three-dimensional image display apparatus, an optical element is used to project images onto a display screen and the sensation of volume derives from use of a time-multiplexed technique to capture the images. In a time-multiplexed imaging technique, images captured from multiple perspectives are sequentially displayed at a certain field rate and a spatial display interval for which one field image of multiview images is displayed is equal to a field period of a planar image divided by the number of multiview images in a viewing zone. In order to divide the viewing zone into multiple regions, each of which corresponds to a different one of the multiple perspectives of the object, the aperture of the optical element is effectively divided by use of a liquid-crystal shutter plate disposed immediately adjacent the optical element. The shutter plate includes a plurality of regularly spaced, substantially parallel strip-type shutters, where the number of strip-type shutters is the same as the number of perspectives. The strip-type shutters are opened and closed in synchronization with the display sequence and period of a field image from each viewpoint.

CRT displays may be utilized in both contact- and projection-type three-dimensional image display apparatus that include an optical element. Contact-type display apparatus have the advantage of small size, although:

(1.) brightness of the display is relatively low, since the viewing zone is widely spread at the front of the optical element;

(2.) viewers typically experience eye strain, since they must focus their eyes on a constant position due to the small viewing zone;

(3.) viewers typically become confused when they move their eyes, since alternating orthoscopic and pseudoscopic viewing zones are viewed due to eye movement.

Projection-type apparatus are bulky and require use of a liquid-crystal shutter to divide the aperture of the optical element in order to display images. Furthermore, a apparatus using an optical element, except for a holographic screen, can be used only with difficulty as a multi-viewer apparatus due to the restriction of a viewing zone location. These difficulties may be ameliorated by using an eye-tracking technique or by forming a plurality of viewing zones. It is however difficult to solve these problems completely since they stem from the characteristics of the optical element.

SUMMARY OF THE INVENTION

The object of the present invention is accordingly to provide a multiview three-dimensional image display apparatus that utilizes a time-multiplexed imaging technique to improve the notoriously low brightness of conventional projection- and contact-type image display apparatus due to the widely-spread viewing zone at the front of an optical element.

Another object of thee present invention is to provide a multiview three-dimensional image display apparatus on which multiple viewers may simultaneously view the same three-dimensional image.

According to one embodiment of the present invention, a multiview three-dimensional image display apparatus comprises: a light source; a shutter plate for selectively passing light from the source; a diffuser immediately adjacent the shutter plate for uniformly diffusing light from the shutter plate; an optical element disposed on the optical path from the diffuser for forming a viewing zone; and a transparent display immediately adjacent the optical element for displaying multiview images, wherein the multiview images are displayed based on a time-multiplexed technique and the Viewing zone in formed at the front of the transparent display.

According to another embodiment of the present invention, a multiview three-dimensional image display apparatus comprises: a plurality of independent light sources; a shutter plate for selectively passing light from the source; a diffuser immediately adjacent the shutter plate for uniformly diffusing light from the shutter plate; an optical element for imaging light from the diffuser and for forming a plurality of viewing zones; and a transparent display immediately adjacent the optical element for displaying multiview images, wherein the multiview images are displayed based on a time-multiplexed technique and the plurality of viewing zone s are formed at the front of the transparent display.

BRIEF DESCRIPTIONS OF THE DRAWINGS

DETAILED DESCRIPTION OF THE PREFERRED EMBODIMENTS

Figure 1:
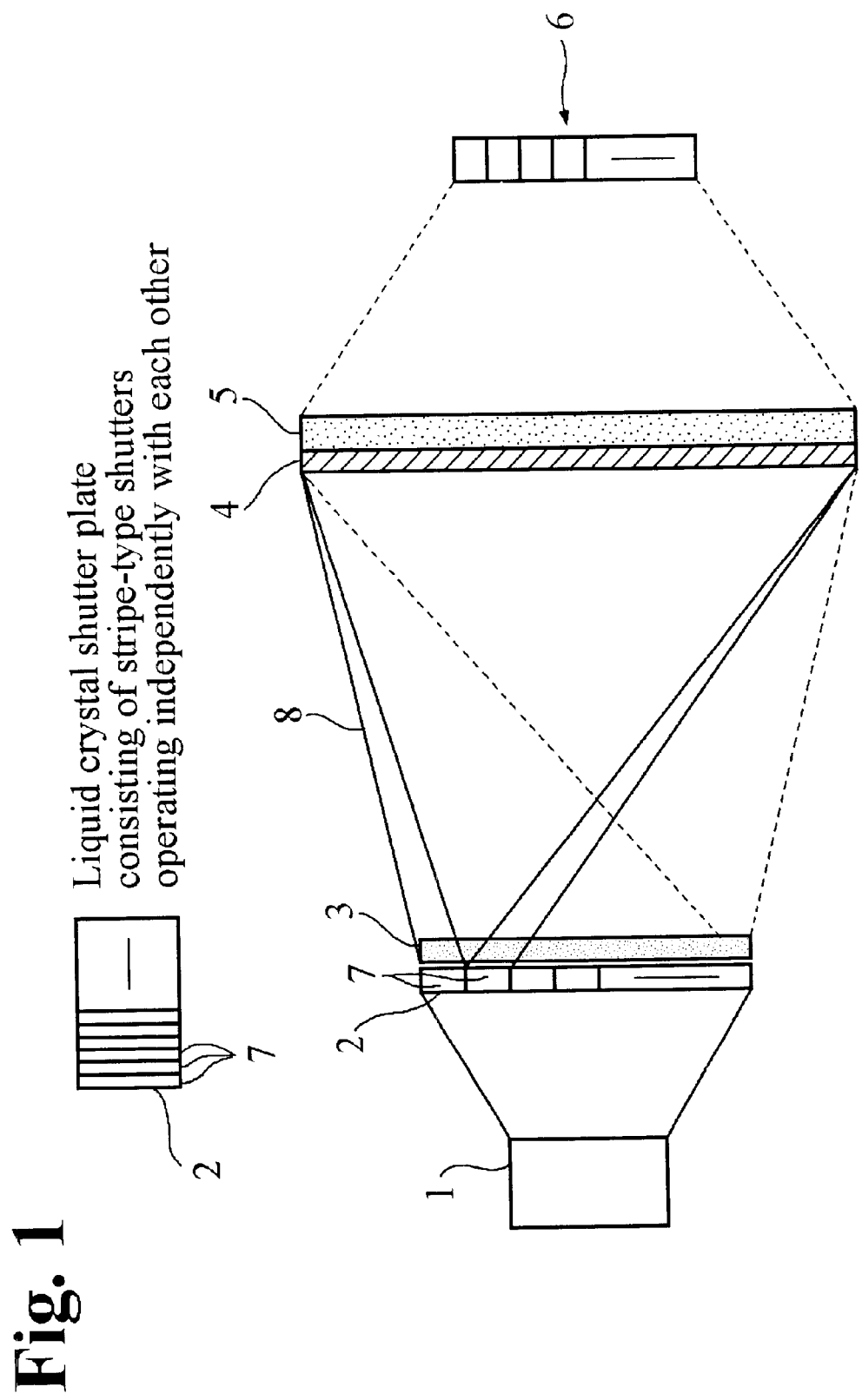
FIG. 1 is a schematic diagram of a multiview three-dimensional image display apparatus that includes a liquid-crystal shutter plate, in accordance with a first embodiment of the present invention.
Figure 2:
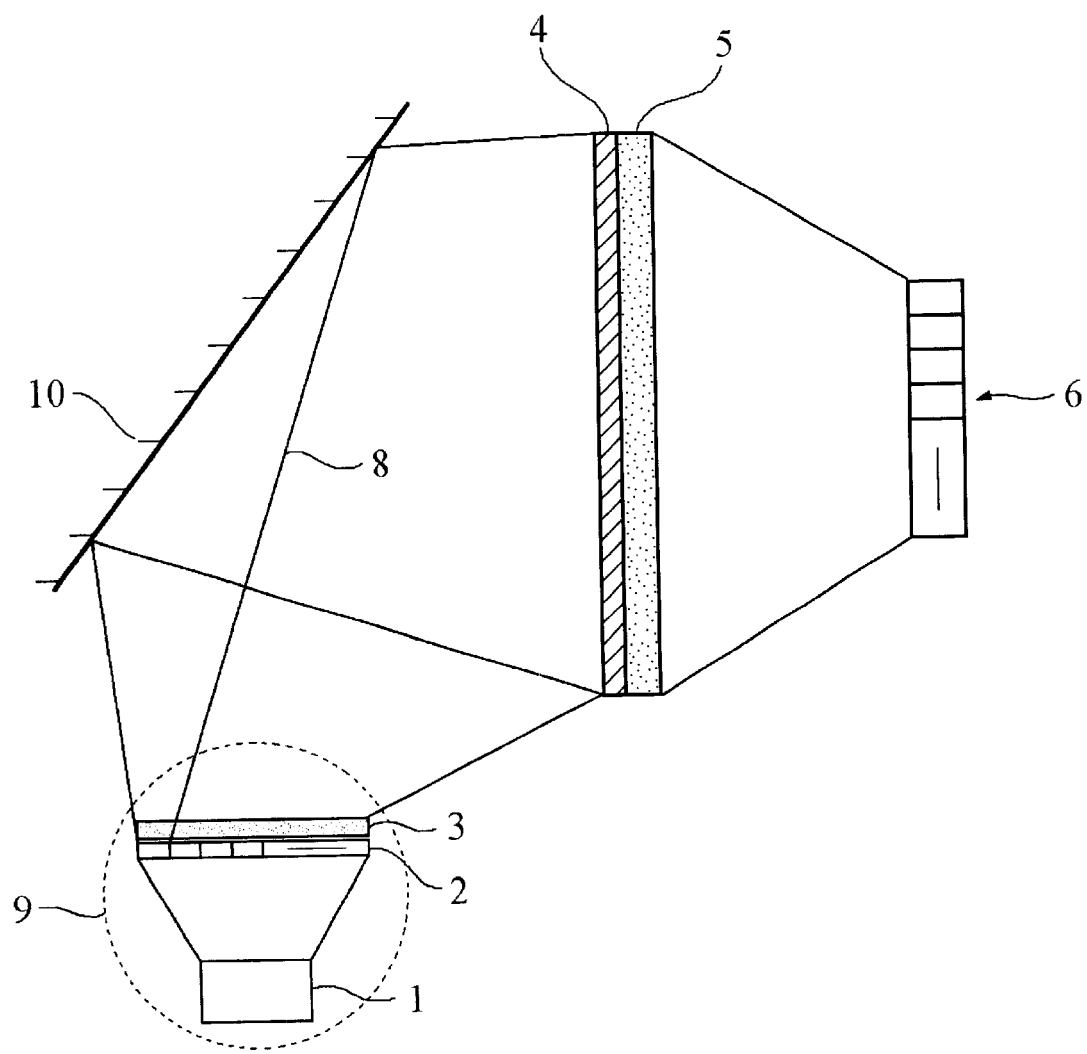
FIG. 2 is a schematic diagram of a multiview three-dimensional image display apparatus that includes a mirror to shorten the distance between the light source 1 and optical element 4 of the apparatus shown in FIG. 1, in accordance with a second embodiment of the present invention.

As shown in FIG. 1, a schematic diagram of a multiview tree-dimensional image display apparatus according to a first embodiment of the present invention, light from a source 1 passes first through one of a plurality of substantially parallel, regularly spaced, uniformly wide strip-type shutters 7 of a liquid-crystal shutter plate 2. Light which has passed through the OPEN shutter of the shutter plate 2 first transits a diffuser 3 immediately adjacent the shutter plate 2 and then transits a transparent optical element 4 (such as a Fresnel lens) before illuminating a transparent display 5 (such as a liquid-crystal display) immediately adjacent the optical element. As shown in FIG. 2, a schematic diagram of a multiview three-dimensional image display apparatus according to a second embodiment of the present invention, a mirror 10 may be used to shorten the distance between the light source 9 and the optical element 4 and thus reduce the physical size of the apparatus. The light source 9 includes the source 1, the shutter plate 2, and the diffuser 3.

Since the diffuser 3 diffuses the light 8 passing through the stripe-type shutter 7, the optical element 4 thus forms a diffuse image 6 of each of the strip-type shutter 7 in front of the display 5. During one cycle of operation of the apparatus, there are as many images formed as there are strip-type shutters 7, although only one of the plurality of strip-type shutters is imaged at any given instant. That is, an image of a particular strip-type shutter may be viewed when that particular shutter is OPEN (i.e., transparent), but not when that shutter is CLOSED (i.e., opaque). The opening and closing of the strip-type shutters 7 and the response of the display 5 must both be fast enough to enable formation of images which do not flicker.

Figure 3:
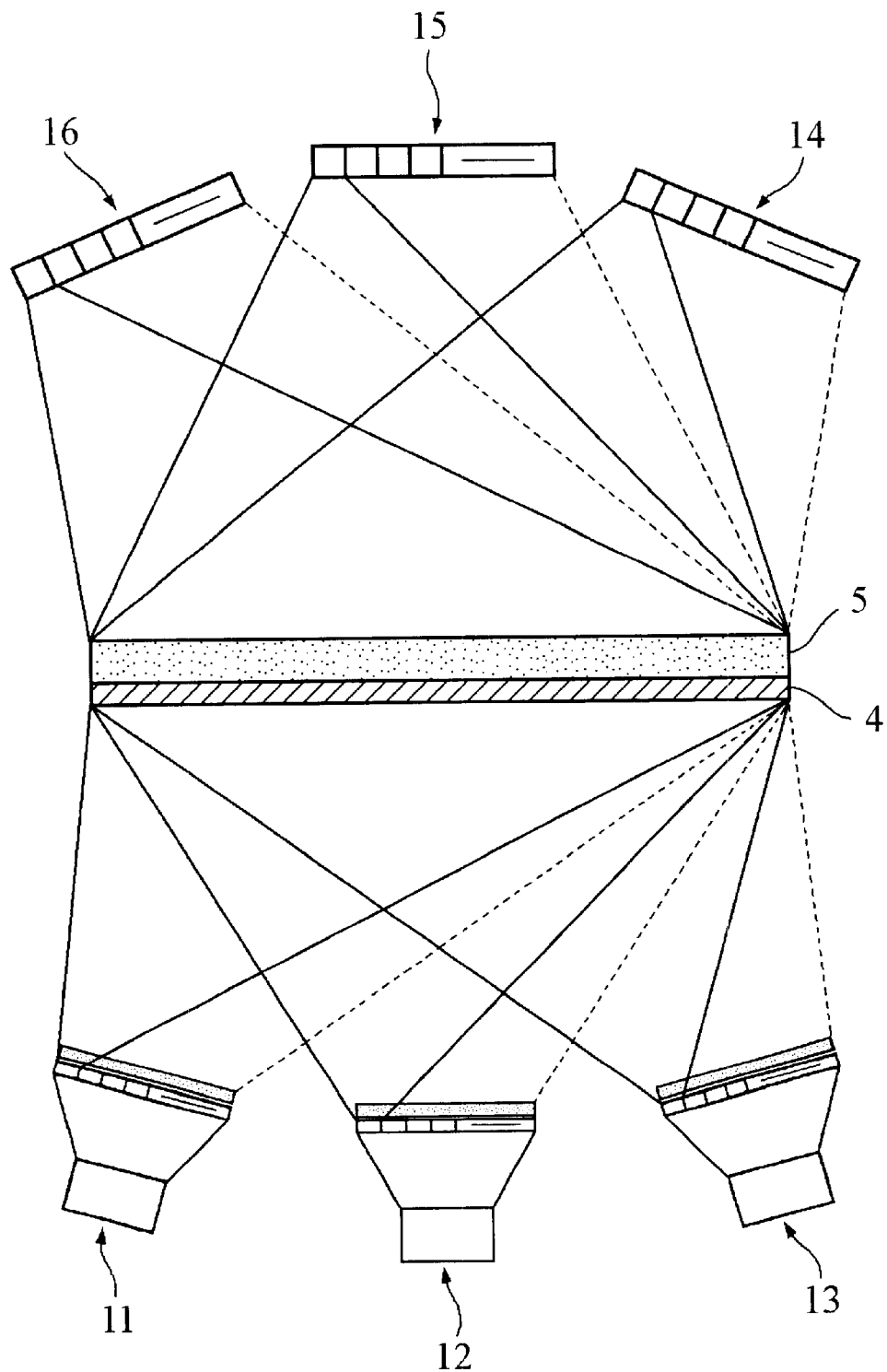
FIG. 3 is a schematic diagram of a multiview three-dimensional image display apparatus that includes a plurality of light sources, in accordance with a third embodiment of the present invention.

As shown in FIG. 3, light from a plurality of independent sources 11–13 passes through the corresponding strip-type shutters of the liquid-crystal shutter plate 2 in front of each of the sources 11–13. Light which has passed through a shutter plate 2 first transits a diffuser 3 immediately adjacent the shutter plate and then transits an optical element 4 (such as a Fresnel lens) before illuminating a transparent display 5 (such as a liquid crystal display) immediately adjacent the optical element 4. Viewing zones 14–16 corresponding to the independent light sources 11–13, respectively, are formed in front of the transparent display 5. Since corresponding strip-type shutters of the liquid-crystal shutter plates 2 open and close synchronously, a plurality of viewers may simultaneously observe the same three-dimensional image through individual viewing zones.

Figure 4:
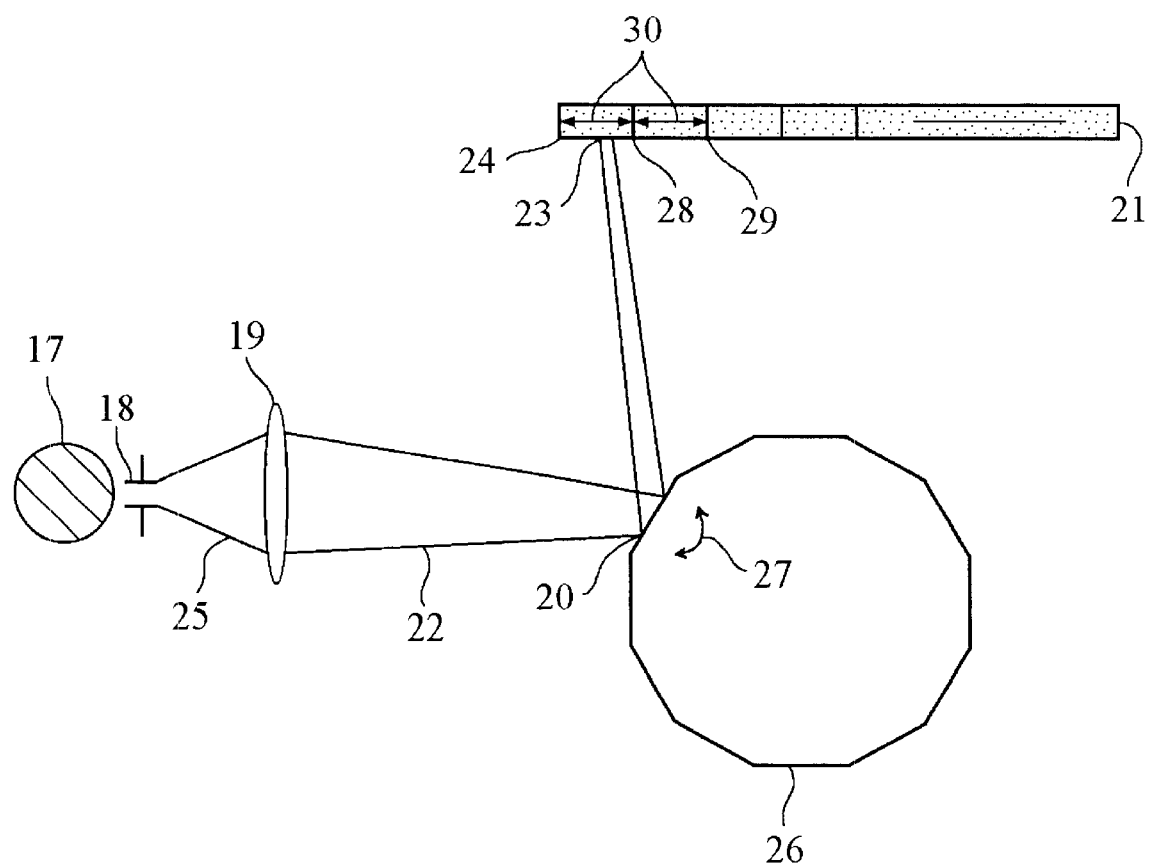
FIG. 4 is a schematic of a multiview three-dimensional image display apparatus that includes a beam scanner, in accordance with a fourth embodiment of the present invention.

As shown in FIG. 4, light 25 from a source 17 passes through a slit 18 and is focused by a lens 19 onto the surface 20 of a beam scanner 27 (e.g., a Galvano scanner) or onto a facet 20 of a rotating polygonal mirror 26. Reference number 22 indicates the light from the lens 19. Movement of the beam scanner 27 or the rotating polygonal mirror 26 causes the image 23 of the slit 18 on the diffuser 21 to move from one position 24 to another position 28 while a first multiview image is being displayed. Movement of the beam scanner 27 or the rotating polygonal mirror 26 thus has the same effect as opening a strip-type shutter whose width is equal to the distance 30 moved by the image of the slit on the diffuser.

While a second multiview image is being displayed, the image 23 of the slit la moves from the position 28 to another position 29. The distance between the positions 28 and 29 is the same as the distance between the positions 24 and 28. The image of the slit on the diffuser continues to move until all of the multiview images have been displayed. The imaging process is repeated starting with the first multiview image. Forming multiple images of a single slit by means of a beam scanner or a rotating polygonal mirror is thus equivalent to forming an image of each of the multiple slits of a shutter plate, where the number of strip-type shutters of the shutter plate is equal the number of images of the single slit.

While several embodiments of the multiview three-dimensional image display apparatus of the present invention have been described in detail above, one of ordinary skill in the art would realize that various changes and modifications may be made to these apparatus without departing from the spirit and scope of the invention. For examples, although the shutter plate 2 was described as a liquid crystal shutter in each of the embodiments of the present invention, any optical shutter may be used, provided the optical shutter is capable of selectively passing light in synchronization with the display of images on the transparent display 5. Although the apparatus described above all utilized a liquid-crystal display, any display may be utilized, provided the display is transparent and is capable of displaying multiview images. Similarly, the Fresnel lens which was used as the optical element in each of the embodiments may be replaced with any optical element capable of forming a viewing zone. Further, although the optical element is disposed in front of the transparent display, the optical element may alternatively be placed behind the transparent display.

What is claimed is:

1. A multiview three-dimensional image display apparatus comprising:

a light source;

a slit for passing a predetermined amount of light from the light source;

a lens for focusing the light passed through the slit;

a beam scanner for repeatedly scanning the light being focused by the lens;

a diffuser for uniformly diffusing the light from the beam scanner in a predetermined direction;

an optical element disposed in front of the diffuser for forming a viewing zone; and a transparent image display disposed in front of the optical element for displaying multiview images in a time-multiplexing manner, wherein the viewing zone is formed in front of the transparent image display, and wherein a width of the slit is determined so that a width of an image of the slit which is formed on the diffuser is narrower than the distance along which one of the multiview images moves during the display thereof.

2. A multiview three-dimensional image display apparatus for forming a viewing zone of a multiview three-dimensional image, which comprises:

a light source;

a slit for passing a predetermined amount of light from the light source;

a lens for focusing the light passed through the slit;

a beam scanner for repeatedly scanning the light focused by the lens; and a diffuser for uniformly diffusing the light from the beam scanner in a predetermined direction, wherein a width of the slit is determined so that a width of an image of the slit which is formed on the diffuser is narrower than the distance along which one of the multiview images moves during the display thereof.

* * * * *